(12) United States Patent
Amos

(10) Patent No.: US 6,554,184 B1
(45) Date of Patent: Apr. 29, 2003

(54) AUTOMATIC INSTANT MONEY TRANSFER MACHINE

(76) Inventor: Carl Raymond Amos, 1670 Bayfield Way, Reston, VA (US) 20194

( * ) Notice: Subject to any disclaimer, the term of this patent is extended or adjusted under 35 U.S.C. 154(b) by 0 days.

(21) Appl. No.: 09/565,389

(22) Filed: May 5, 2000

Related U.S. Application Data

(60) Provisional application No. 60/133,123, filed on May 7, 1999.

(51) Int. Cl.[7] ............................................. G06F 17/60
(52) U.S. Cl. ...................... 235/379; 235/380; 235/381; 235/383; 705/42; 705/43
(58) Field of Search ................................. 235/379, 380, 235/375, 382, 381, 383, 487; 705/42, 43, 17, 26

(56) References Cited

U.S. PATENT DOCUMENTS

| | | | | |
|---|---|---|---|---|
| 4,454,414 A | * | 6/1984 | Benton | 235/379 |
| 5,220,157 A | * | 6/1993 | Martin et al. | 235/379 |
| 5,508,500 A | * | 4/1996 | Martin et al. | 235/381 |
| 5,650,604 A | * | 7/1997 | Marcous et al. | 235/379 |
| 5,659,165 A | * | 8/1997 | Jennings et al. | 235/379 |
| 5,686,713 A | * | 11/1997 | Rivera | 235/380 |
| 5,825,003 A | * | 10/1998 | Jennings et al. | 235/379 |
| 5,909,794 A | * | 6/1999 | Molbak et al. | 235/380 |
| 5,949,044 A | * | 9/1999 | Walker et al. | 235/379 |
| 5,963,647 A | * | 10/1999 | Downing et al. | 235/379 |
| 5,982,918 A | * | 11/1999 | Mennie et al. | 705/43 |
| 6,012,050 A | * | 1/2000 | Eaton et al. | 705/42 |
| 6,039,250 A | * | 3/2000 | Ito et al. | 235/380 |
| 6,149,057 A | * | 11/2000 | Hollis | 235/379 |

\* cited by examiner

Primary Examiner—Karl D. Frech
Assistant Examiner—U Chau Le

(57) ABSTRACT

The Instant Money-Automatic Transfer Machine system (Aunty IM) is a multiplicity of devices on a communications network available 24 hours a day, as sender, receiver and dispenser of funds interchangeably. The Aunty IM accepts standard currancy for deposit amounts or fees charged to transfer to another such reciever/dispenser device. The Sender starts a pending transaction transfer by indicating which device pays for the transfer (Sender, device A, or Dispenser, device B), to whom and where the funds are to be made available to device(s) $B_{1-n}$. The amount is fed into currency acceptor at device A and a receipt is generated by the Sender, device A. A Receiver becomes a Dispenser only when the Receiver retrieves the pending transaction from device A using a verifiable password or identification. The cash is dispensed. The fee is charged at either end of the transaction.

16 Claims, 3 Drawing Sheets

AUTOMATIC INSTANT MONEY TRANSFER MACHINE

Incorporated by reference herein is the Provisional Application No. 60/133,123 with filing date May 7, 1999, entitled Automatic Instant Money Transfer Machine, AIMTM.

BACKGROUND OF THE INVENTION

The invention relates to devices used to transfer funds or currency by electronic means. It is well know in the art that the money transfer industry requires using an Agent, usually a franchised store's clerk with cash or credit, telephonic means or EDI means with credit to transfer funds from one individual at a proximal location to another individual or entity at a distal location. MoneyGram, Western Union, CyberCash and others operate in this fashion. In a broad sense the invention is a combination of apparatuses which in itself is an apparatus used to transfer money or funds and the invention is a system used to transfer money.

SUMMARY OF THE INVENTION

The invention presented is not limited to requiring a physical person, telephonic means, or EDI based means to accomplish a funds transfer. Instead this invention utilizes a device which could be consider a hybrid apparatus, drawing on aspects of both a vending machine and an automated teller machine (ATM). Both are well know in the art of electronic money handling devices. The Instant Money-Automatic Transfer Machine or Aunty IM operates like a reciprocal ATM, utilizing a communications network (wired, optical or wireless in nature) to transmit information between a multitude of like devices. The devices, available 24 hours a day, operate as sender, receiver, and dispenser of funds interchangeably. The Aunty IM will accept standard currency, i.e. coins and bills, usually in denominations of $1 to $100. Alternately, funds are entered using standard credit and/or banking cards in lieu of cash at the device or through a PC over an Internet web page or the Central Database Server (CDBS) or by phone, wherein the transfer network alternately has access to any financial institution or by means known to those skilled in the art. Additionally, an ATM via system modifications can accept transferred funds from the Aunty IM system and transfer funds to the Aunty IM system by an individual accessing his/her designated financial account through the ATM's network. The benefit of this system is that it eliminates the expense of Agents, Tellers and/or Clerks who supervise the transfer transactions. The other benefit is that the Aunty IM transfers funds to an individual unlike an ATM's one way dispensing fund to the user and which only transfers money to a specified account.

Another embodiment is that the currency (cash) inserted or fed into the Aunty IM becomes reusable in the device. The deposited amount is tallied and settled and then recycled into the cash inventory available to dispense. Only the fees charged for transactions are set aside and dropped into a safe or other deposit storage means to be removed later.

BRIEF DESCRIPTION OF DRAWINGS

The apparatus illustrated in FIG. 1 is the $1^{st}$ embodiment, consisting of device (A/B), money order/receipt dispenser (R), bill (currency) dispenser (C), optional credit/debit card reader (D), key board/pad (K), bill (currency) and coin acceptor (Q), coin return (G), display unit/touch screen (S), housing (H).

The system of illustrated

Figure 3:
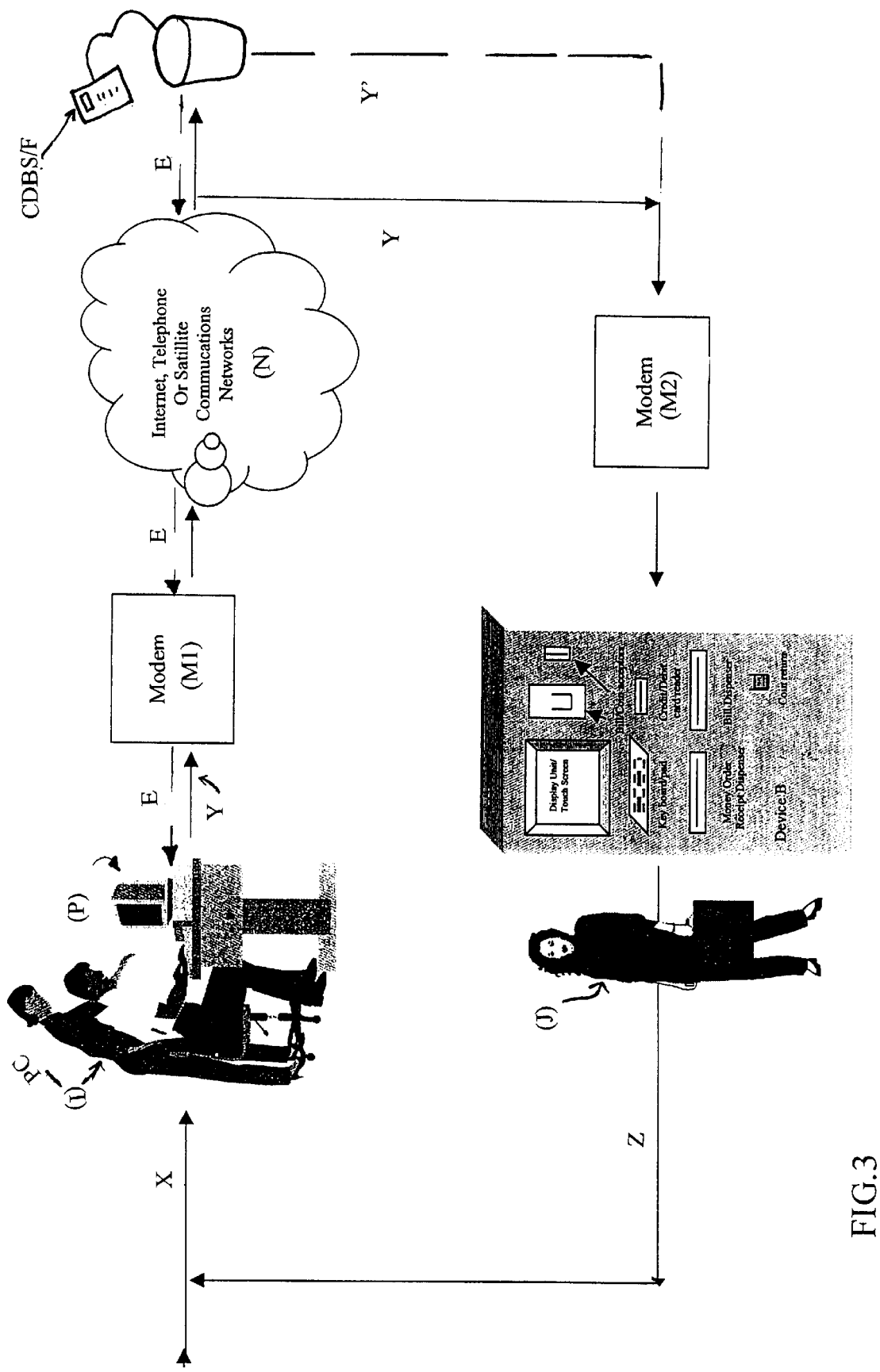

The system illustrated in FIG. 3 is the $3^{rd}$ and $4^{th}$ embodiment, consisting of a PC or financial services institution's terminal (P), modems/transceivers (M1/M2), device (B), communications network or system (N), a transfer initiator (I'), a transfer recipient/designee (J) and optional Central Database Server (CDBS) or financial institution (F). This figure also includes the data flow, data inputted (X) by the transfer initiator, the first set of signals consisting of transaction information (Y/Y'), a second set of signals consisting of retrieval information (Z), and optional email or cookie receipt (E).

DETAILED DESCRIPTION OF INVENTION

Figure 1:
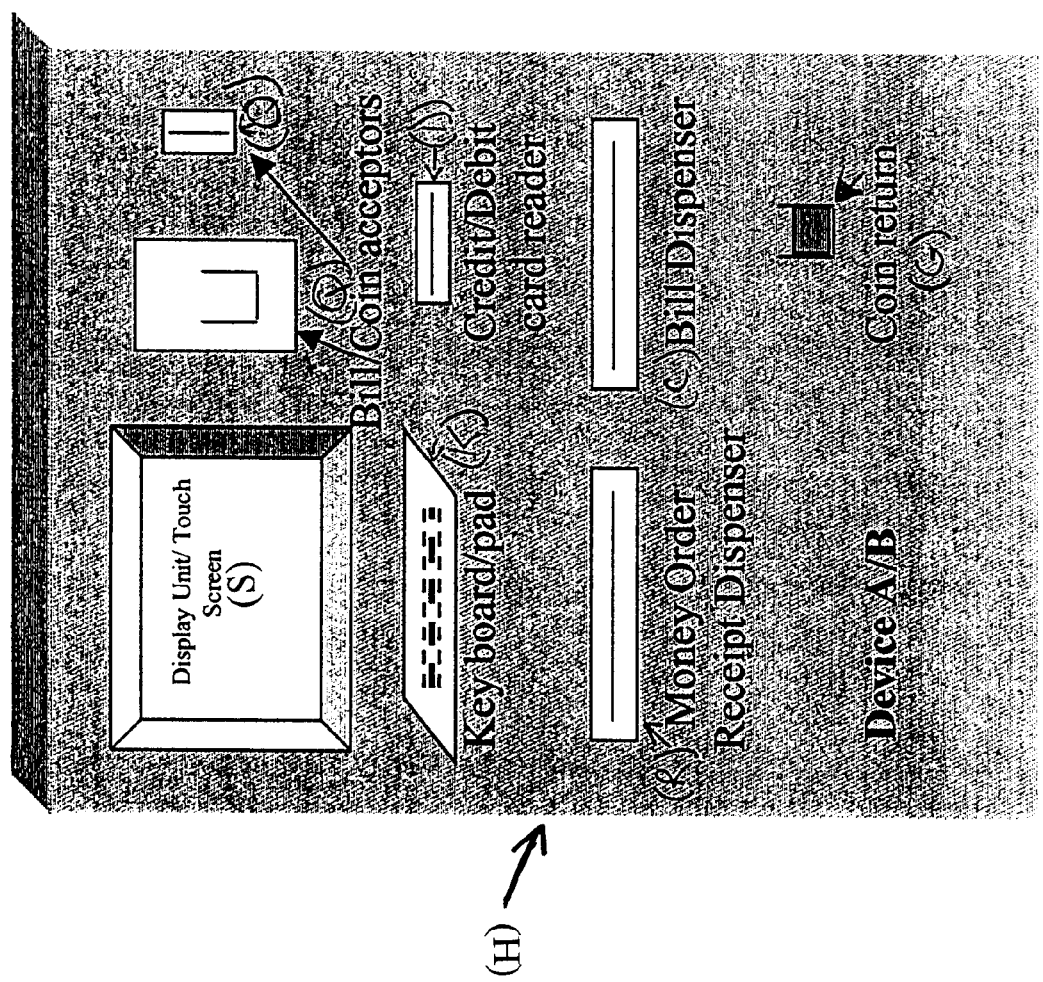
Figure 2:
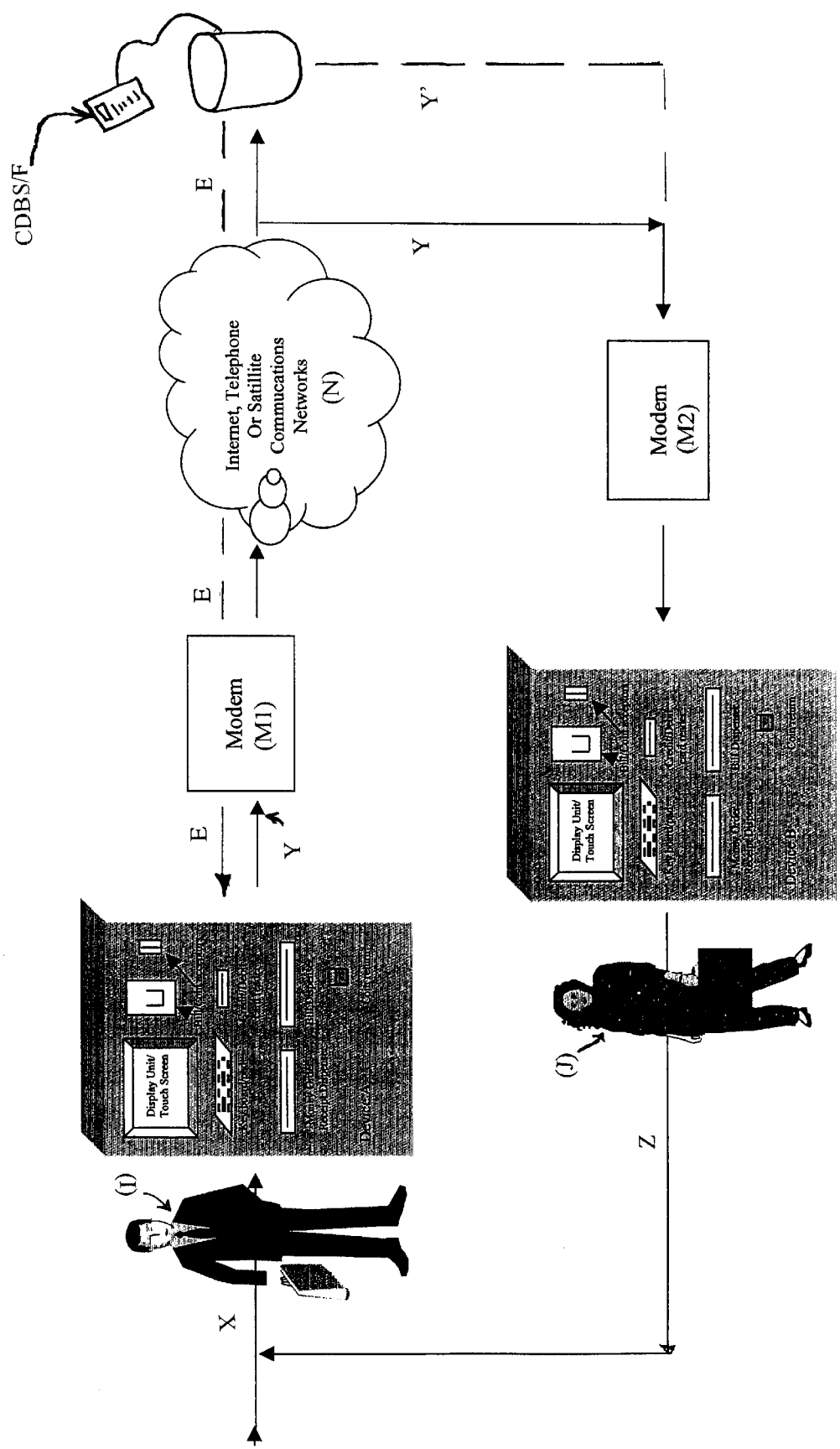
FIG. 2 is the $2^{nd}$ embodiment, consisting of devices A and B, modems/transceivers (M1/M2), communications network or system (N), a transfer initiator (I), a transfer recipient/designee (J) and optional Central Database Server (CDBS) or financial institution (F). This figure also includes the data flow, data inputted (X) by the transfer initiator, the first set of signals consisting of transaction information (Y/Y'), a second set of signals consisting of retrieval information (Z).

The instant invention, as described and illustrated herein, is a money transfer process and device consisting of a cash accepting/dispensing devices, coin accepting/return device coupled to a display unit, data input devices and a printer /dispenser that utilizes a computer/microprocessor and a modem for control and communication to multiple such devices (A1–n, B1–n) and/or a centralized database for transactions, accounting and inventory control. A multiplicity of the devices on a communications network (N), telephonic, wireless, etc., available 24 hours a day, as sender, receiver and dispenser (A or B) of funds interchangeably. A Receiver becomes a Dispenser only when the Receiver retrieves the pending transaction from device (A) using a verifiable password or identification. The Sender, device (A), indicates a transfer is desired through a pending transaction generated from the transfer information. The transfer information consists of who pays for the transfer (Initiator or Recipient), identification data about the Recipient (to whom), and identification data about the location (s) (to where), the funds are to be made available to device $B_n$ (or devices $B_{n-1}$ nat multiple sites). In FIGS. 1 and 2, the money to be sent and optionally the applicable fee is inserted into the bill or coin acceptors (Q) at device (A) and is verified against the keypad, keyboard or touch screen (S) input amount. A password is then either inputted by the Initiator (I) or generated by Sender (A) to give the Recipient (J) by phone or other means and added to pending transaction. The transaction information is verified by the Sender, device (A), with the Initiator (I). A first set of signals (Y) consisting of the pending transaction information is transmitted via modem/transceiver (M1) through communications network (N). An optional receipt is then generated by the printer through the dispenser (R) for the Initiator (I). Alternately a cookie, email or by means known to those skilled in the art (E) is given to the Initiator's or (I')-PC to verify the transaction via the CDBS or Internet web page. The Recipient, notified as mentioned above, at a Receiver, device (B1), proceeds to retrieve the funds through device B1 indicating a retrieval is desired using the password. The information is verified by device B1 which now becomes a Dispenser. A second set of signals (Z) consisting of retrieval transaction information is transmitted back to the CDBS and/or device (A) or financial institution (F). The CDBS, financial institution or device (A) cancels the pending transfer transaction indicating the funds are no longer available to other sites, devices ($B_{n-1}$) when the second set of signals (Z) are received. Then the currency is dispensed minus any applicable fee. The nominal fee which may include appropriate taxes is charged at either or both of ends of the transaction. Embodiments 3 and 4 relate to using a PC and financial service institution, respectively, to initiate funds transfers.

Optional Features Include but not Limited to
- post/future dated retrieval of money transfers;
- a maximum wait time (MWT) to retrieve transferred funds, when the MWT elapses the funds are returned to the Initiator or Designee;
- any network or networking architecture and/or protocols available to facilitate communications between multiple machines (devices A and B) and/or the CDBS;
- encryption of first and second signals for privacy and security;
- anonymity function for transactions;
- transactions include paying for money orders (financial instruments), stocks/bonds, tickets (airline/entertainment), bills, etc.;
- check cashing services with password/codes;
- foreign currency adaptable;
- multiple language and Braille adaptations;
- Dunce's guide to money transfers (a tutorial on how to utilize the Aunty IM apparatus);
- biometric device information for recipient identification.

What is claimed is:

1. A money transfer system comprising of a plurality of money transfer devices, each of said money transfer devices comprises a currency accepting means, a currency dispensing means, a coin accepting means, a coin dispensing means, a data input means, and an output means, wherein said output means is a printer; the system further comprises a computer which includes a microprocessor and a modem for controlling communication directly between the plural of said money transfer devices.

2. A money transfer system comprising a plurality of money transfer devices, each of said money transfer devices comprises a currency accepting means, a currency dispensing means, a coin accepting means, a coin dispensing means, a data input means, a display means, and output means; the system further includes computing means and telecommunication means, wherein the telecommunications means directly controls communication between the plurality of said money transfer devices.

3. The system of claim 2, wherein each money transfer device operates as a sender, receiver and dispenser of funds interchangeably.

4. The system of claim 2, wherein money is fed into a proximal money transfer device and electronically causing a dispensing of like funds at a distal money transfer device.

5. The system of claim 2, whereby currency or money amounts are transmitted over distances reciprocally to similarly interconnected web of money transfer devices whereby inserting currency at proximal end will cause by electronic means dispensing of like finds at distal end.

6. The system of claim 2, wherein said money transfer devices utilize a communications network between proximal and distal ends.

7. The system of claim 2, wherein said system further comprises a central database server to record transactions and for accounting and inventory control.

8. The system of claim 2, wherein the system uses an automated teller machine network.

9. The system of claim 2, wherein the system uses currency, credit or banking cards at the money transfer devices or through a personal computer or the central database server and accesses proximal and distal financial institutions.

10. The system of claim 9, which includes automated teller machine system modifications to accept transfer transactions funds from said money transfer devices and said funds to said devices by a user accessing a designated financial account through an automated teller machine network, the Internet, or communication means.

11. The system of claim 2, which further comprises biometrics means to identify both an initiator and recipient.

12. The system of claim 2, wherein currency acceptor means and coin acceptor means include recycling means to dispense money accepted as funds to be dispensed.

13. A method of money transfer between a plurality of money transfer devices, each of said money transfer devices at a proximal end transmits information utilizing a communication network on a transaction to be completed at a distal end,
  a) the transaction information comprises:
    i) a recipient identification data,
    ii) a designated distal end or general locality,
    iii) an amount of finds in the transaction,
    iv) what type of funds is to be made available to one or more money transfer devices at said distal end,
    v) what type of finds has been accepted by the money transfer device, whether currency, credit or debit,
    vi) confirmation and transaction codes and a password,
  b) wherein said money transfer device designations comprise:
    i) each money transfer device is either a sender or a receiver or a dispenser interchangeably, depending on whether the money transfer device is on the proximal or distal end of said transaction,
    ii) said money transfer device becomes the sender by initiating said transaction,
    iii) said money transfer device becomes the receiver by receiving a signal that said transaction is pending in said designated general locality,
    iv) said receiver becomes the dispenser only when one receiver money transfer device on the distal end indicates a retrieval of a pending transaction;
  c) wherein said transaction transpires in the following manner:
    i) when a transaction initiation signal is generated said transaction information is prompted to be entered to said money transfer device, said sender, on the proximal end, ii) the sender money transfer device generates a confirmation code and prompts for said password, if said password is not entered then said password is internally generated, iii) said sender money transfer device verifies all said transaction information, iv) said transaction information is then encrypted for transmittal, v) said sender money transfer device generates a receipt, vi) a first set of signals is sent to distal end or designated general locality for receiver money transfer devices, vii) an input signal, is received by the receiver money transfer device to indicate a retrieval of a pending transaction, viii) the password is inputted to the receiver money transfer device to initiate the retrieval ix) the transaction information is verified by the receiver money transfer device, which then becomes the said dispenser money transfer device, x) a second set of signals is transmitted back to the sender money transfer device to indicate the pending transaction is no longer available, xi) said amount of funds are dispensed according to the transaction information.

14. The method of claim 13, wherein said transferred funds are dispensed as currency or financial instruments.

15. The method of claim 13, wherein said currency is recycled into the money transfer device as funds to dispense.

16. The method of claim 13, wherein the transaction information includes whether the proximal or distal end of the transaction pays or provides the transaction fee.

* * * * *